United States Patent [19]
Yoshitake et al.

[11] 3,890,554
[45] June 17, 1975

[54] SYSTEM FOR DRIVING A PULSE MOTOR

[75] Inventors: Norito Yoshitake, Hino; Hiroshi Usami; Katsuo Kobari, both of Yokohama; Hiroshi Ishida; Yoshiki Fujioka, both of Hino, all of Japan

[73] Assignee: Fujitsu Limited and Fujitsu Fanuc Limited, Tokyo, Japan

[22] Filed: Apr. 18, 1974

[21] Appl. No.: 462,131

[30] Foreign Application Priority Data
Apr. 26, 1973 Japan.............................. 48-47727
Apr. 26, 1973 Japan.............................. 48-47728

[52] U.S. Cl. ................ 318/696; 318/138; 318/341
[51] Int. Cl. .......................................... H02k 37/00
[58] Field of Search .......... 318/311, 329, 341, 314, 318/138, 696, 685

[56] References Cited
UNITED STATES PATENTS
| | | | |
|---|---|---|---|
| 3,199,009 | 8/1965 | Lien et al............................ | 318/696 |
| 3,424,961 | 1/1969 | Leenhouts.......................... | 318/696 |
| 3,757,193 | 9/1973 | Inaba et al......................... | 318/696 |

Primary Examiner—B. Dobeck
Attorney, Agent, or Firm—Maleson, Kimmelman and Ratner

[57] ABSTRACT

A driving system of a pulse motor provides an exciting signal generator for generating poly-phase rectangular exciting signals each of which has a phase difference depending on the speed of command pulses and poly-phase trapezoid exciting signals each of which, like the poly-phase rectangular exciting signals, has a phase difference depending on the speed of command pulses, control circuits for controlling exciting currents which are supplied to exciting coils of the pulse motor in response to the exciting signals, and speed detecting circuit for detecting whether the speed of command pulses is in the low speed range or the high speed range. When the speed of the command pulses is in the low speed region, the poly-phase trapezoid exciting signals are supplied to the control circuits to drive the pulse motor and when the speed of the command pulses in the high speed region, the rectangular exciting signals are supplied to the control circuits to drive the pulse motor.

4 Claims, 16 Drawing Figures

Fig. 1
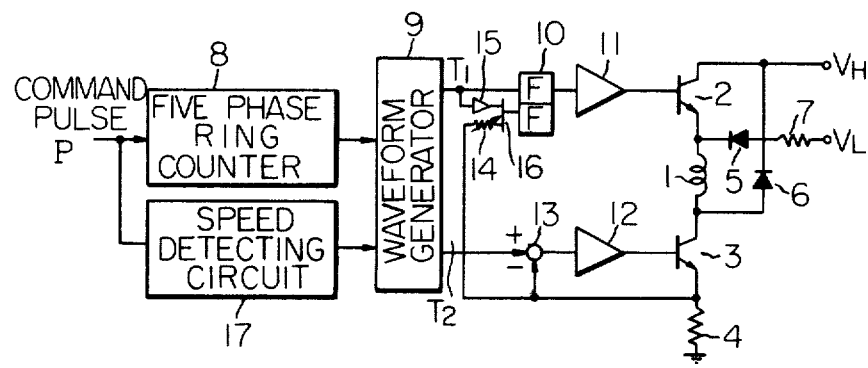
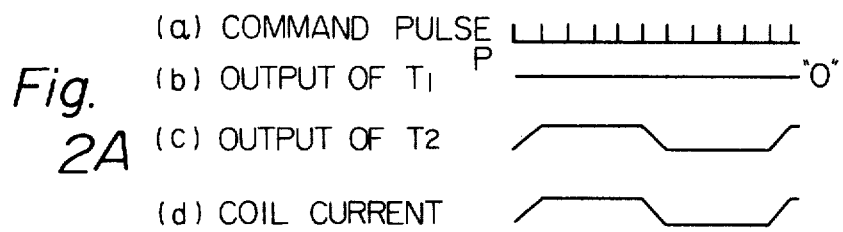
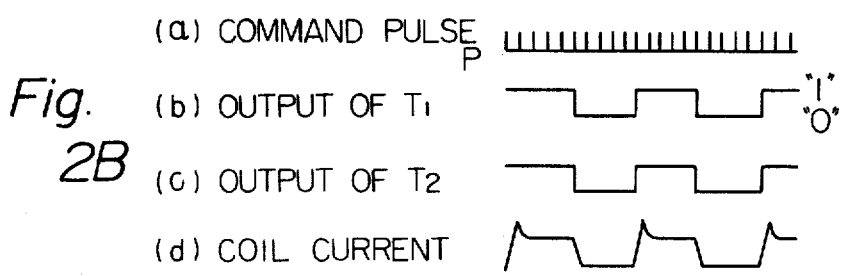

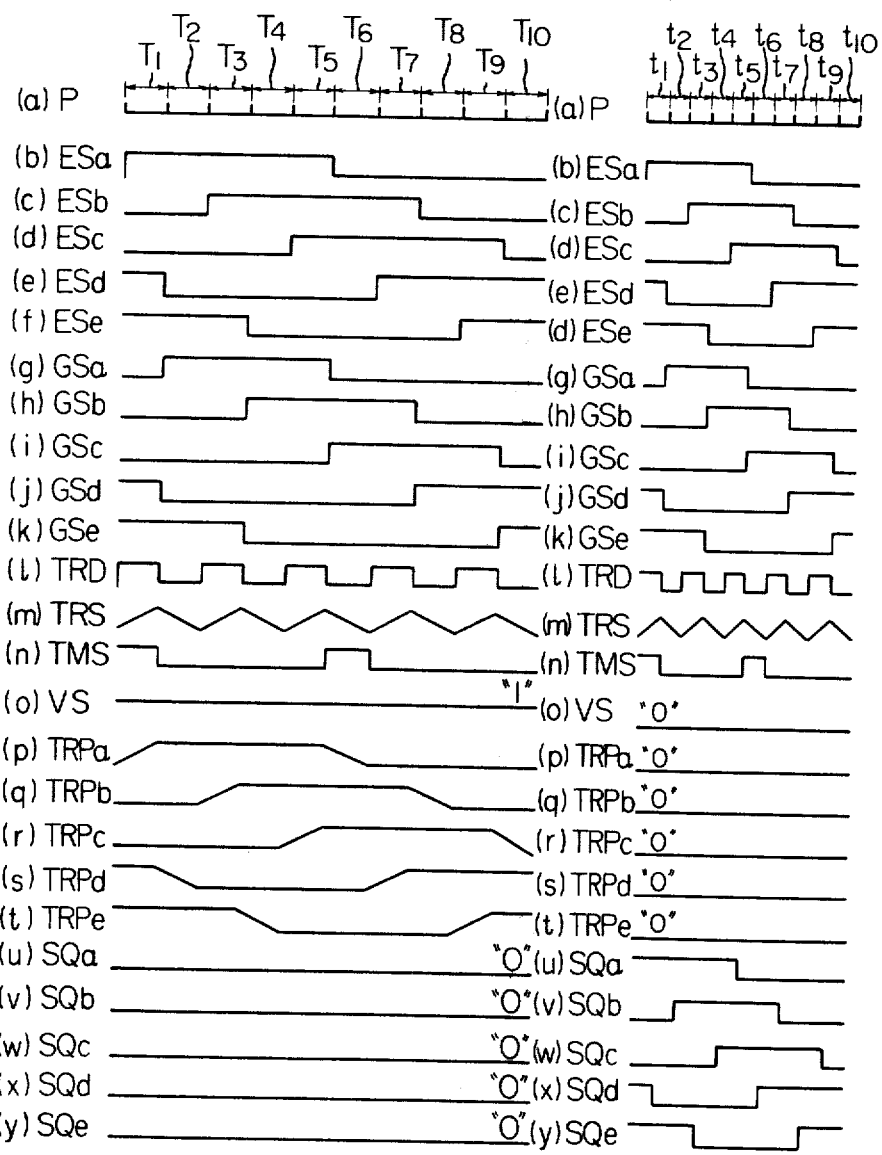

3-2 PHASE DETECTING CIRCUIT

| | ESa | ESb | ESc | ESd | ESe | OUTPUT |
|---|---|---|---|---|---|---|
| P → COUNTER CLOCK WISE / P ↓ CLOCK WISE | 1 | 1 | 1 | 0 | 0 | 1 |
| | 0 | 1 | 1 | 0 | 0 | 0 |
| | 0 | 0 | 1 | 1 | 0 | 1 |
| | 0 | 0 | 1 | 1 | 0 | 0 |
| | 0 | 0 | 0 | 1 | 1 | 1 |
| | 1 | 0 | 0 | 1 | 1 | 0 |
| | 1 | 0 | 0 | 0 | 1 | 1 |
| | 1 | 1 | 0 | 0 | 1 | 0 |
| | 1 | 1 | 0 | 0 | 0 | 0 |

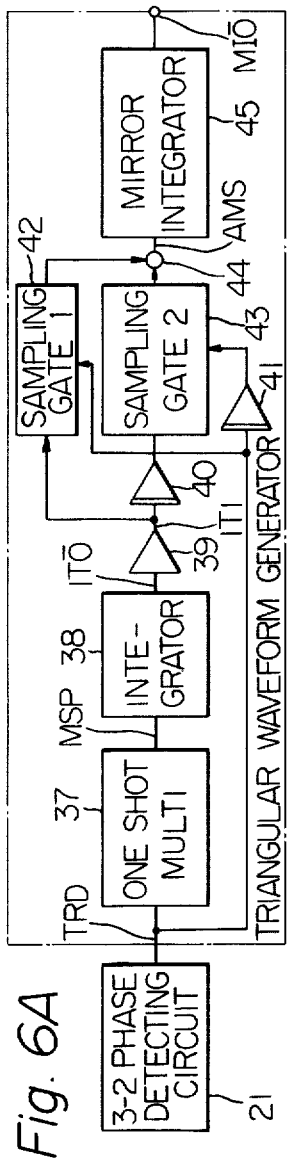
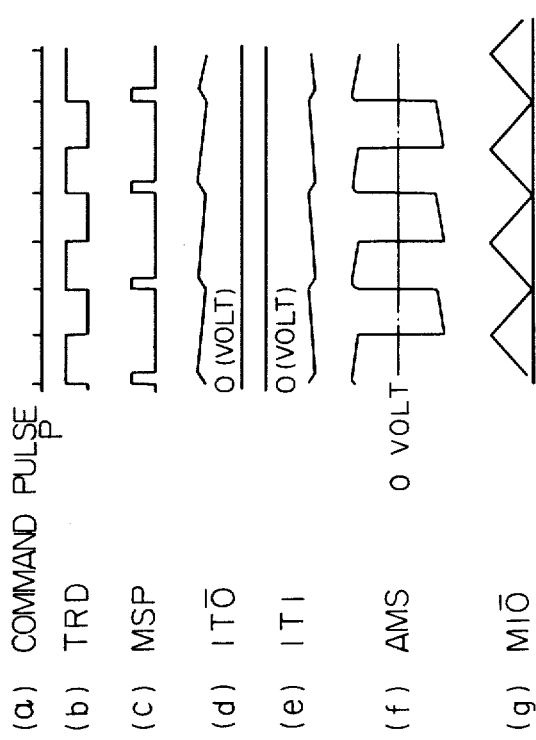
Fig. 6A
Fig. 6B (a) P (b) ESa (c) TRD (d) DP1

(e) DP2

(f) DP (g) EXOR (h) TMS (a) Pi
(b) TRD
(c) UDP
(d) STW
(e) M̄Ō
(f) COMO
(g) VS

Fig. 9A
Fig. 9B
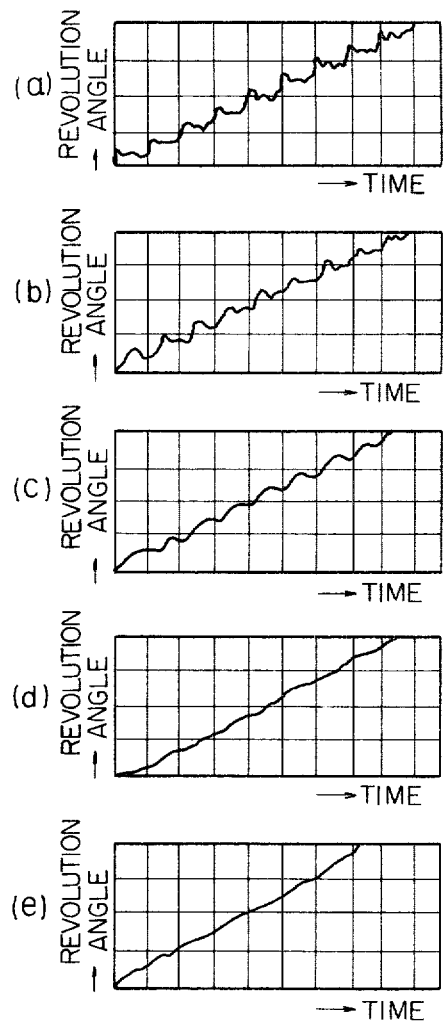
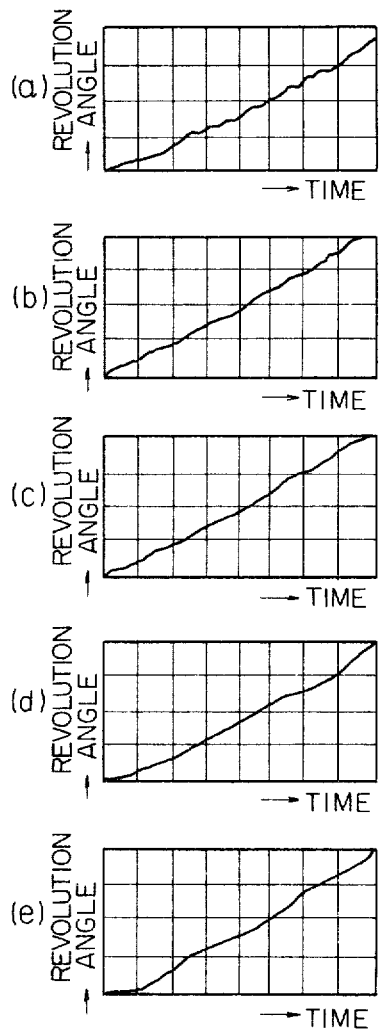

SYSTEM FOR DRIVING A PULSE MOTOR

DETAILED EXPLANATION OF THE INVENTION

The present invention relates to a system for driving a pulse motor, especially to a system for driving a pulse motor which requires stepless revolution, high torque and high speed revolution.

The pulse motor is driven by precise synchronization with command pulses. Therefore, the pulse motor can constitute a high accuracy servo-system with open loops. However, because the revolution of the pulse motor is carried out stepwise, the discontinuity of revolutions is remarkable especially when the motor is driven at low speeds. Further, as the pulse motor is driven by pulses, the driving torque at high speeds becomes insufficient, because inductances of the exciting coils deteriorate the rising time of the exciting current.

The above-mentioned discontinuity of revolutions renders use of the pulse motor undesirable in a finishing machine. That is, on the surface of the work which is finished by the finishing machine provided with said pulse motor, stripes appear due to the intermittent step rotations of said pulse motor. Therefore, the appearance of the finished surface of the work is spoiled.

For the purpose of eliminating the above-mentioned drawback, the amount of step per one command pulse is decreased by increasing the number of teeth and the number of exciting phases of the pulse motor. However, the number of teeth and the number of exciting phases of the pulse motor have a maximum limit, so that the appearance of the work cannot be improved beyond a certain limit. Further, in this method, the number of command pulses required for the constant revolutional angle of the pulse motor increases. Therefore, since the speed of the command pulses increases the operation speed of a pulse distributor which generates the command pulses, is required to be higher.

One of the objects of the present invention is to provide a system for driving a pulse motor which eliminates undesirable step motions at low speeds, compensates insufficient torque due to the inductance of the exciting coils at high speeds, and improves the driving characteristics of the motor at both high and low speeds.

The other object of the present invention is to provide a system for driving a pulse motor which provides poly-phase trapezoid exciting signals required for continuous rotation of the pulse motor.

According to the characteristic feature of the present invention, a system for driving a pulse motor comprises exciting signal generating means for generating poly-phase rectangular exciting signals, each of which has a phase difference depending on the speed of command pulses and poly-phase trapezoid exciting signals, each of which has a phase difference depending on the speed of command pulses, controlling means for controlling exciting currents which are supplied to exciting coils of said pulse motor in response to the exciting signals, speed detecting means for detecting whether said speed of said command pulses is in the low speed range or the high speed range, and means for supplying said poly-phase trapezoid exciting signals to said controlling means when said speed of said command pulses is in said low speed region and for supplying said poly-phase rectangular exciting signals to said controlling means when said speed of said command pulses is in said high speed region.

Further features and advantages of the present invention will be apparent from the ensuing description, with reference to the accompanying drawings to which, however, the scope of the invention is in no way limited.

FIG. 1 is a block diagram of the system for driving a pulse motor according to the present invention;

FIGS. 2A and 2B are a series of signal waveforms at several points in the block diagram shown in FIG. 1;

FIGS. 4A and 4B are a series of signal waveforms at several points in the block circuit diagram shown in FIG. 3;

FIG. 6A is a block diagram of the triangular waveform generator shown in FIG. 3;

FIG. 6B is a series of signal waveforms at several points in the block circuit diagram shown in FIG. 6A;

Figure 3:
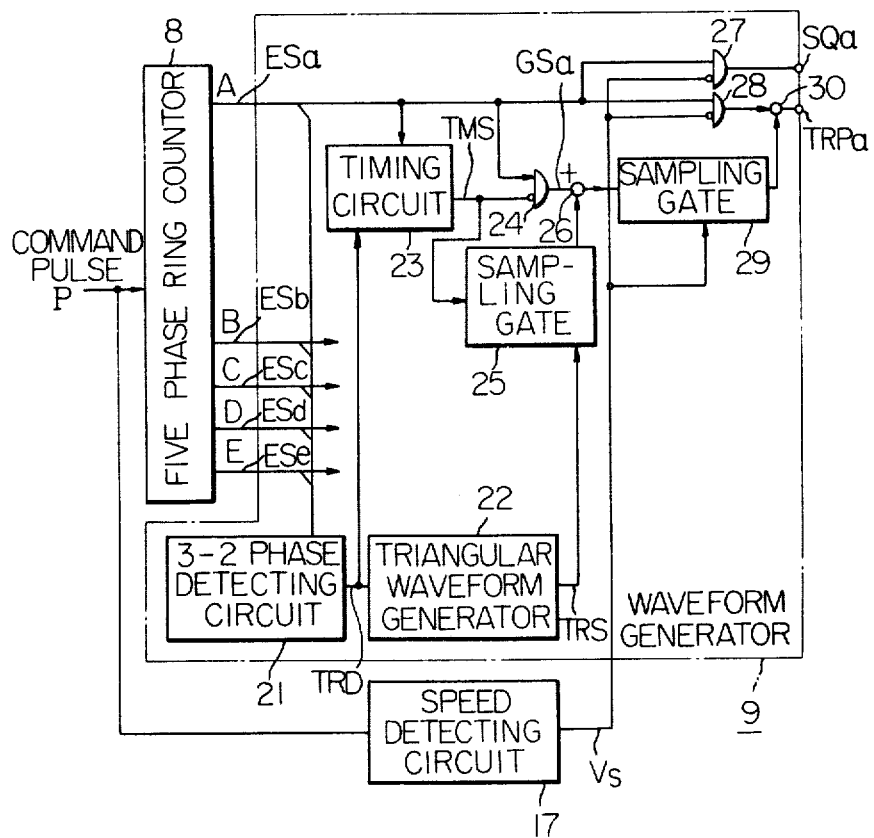
FIG. 3 is a block diagram of the waveform generator shown in FIG. 1.

Referring to FIG. 1, reference numeral 1 indicates an exciting coil of a pulse motor. Although in this Fig. only one exciting coil is shown, it is understood that, actually, a five phase pulse motor is provided with five exciting coils. Reference number 2 indicates a transistor which is used as a switching element, for applying a high voltage. Reference number 3 indicates a transistor which is used as a control element, and reference number 4 indicates a resistor for detecting a current in the exciting coil 1. Transistors 2 and 3, the exciting coil and the resistor 4 are connected in series between high voltage terminal $V_H$ and a ground. The series circuit of the exciting coil 1, transistor 3 and resistor 4 are connected via a diode 5 and a protecting resistor 7 to low voltage terminal $V_L$. For the purpose of absorbing a counter electromotive force generated in the exciting coil 1, the ground side terminal of the exciting coil 1 is connected to a diode 6 which is connected to high voltage terminal $V_H$. Reference numeral 8 indicates a five phase ring counter and reference number 9 a waveform generator which provides output terminals $T_1$ and $T_2$. Reference number 10 is a flip-flop circuit, reference numbers 11 and 12 are amplifiers, reference numbers 13, 14, 15, 16 and 17 respectively indicate an adder, a variable resistor, an inverter, an OR gate and a speed detecting circuit.

Next, the function of the block diagram shown in FIG. 1 will be explained, using the waveforms shown in FIGS. 2A and 2B. When the command pulses P are supplied to the five phase ring counter 8, said counter 8 sends an exciting signal to the waveform generator 9 in order to excite predetermined coils. The function of the generator will be explained later. The command pulses are also supplied to the speed detecting circuit 17. Said circuit 17 detects the speed of the applied command pulses and sends information indicating that said speed is greater or less than a predetermined reference speed, to the waveform generator 9. When the speed is less than the predetermined reference speed, the waveform generator generates a trapezoid waveform voltage shown as (c) of FIG. 2A, of terminal $T_2$ and a zero output, shown as (b) of FIG. 2A, at terminal $T_1$, thereby resetting the flip-flop circuit 10 and placing transistor 2 in an "off" condition. Transistor 3 is placed in an "on" condition by the output of amplifier 12. Therefore, the current in exciting coil 1 is supplied by the circuit composed of the low voltage terminal $V_L$, resistor 7, diode 5, exciting coil 1, resistor 4 and a ground. This current in the exciting coil is detected by resistor 4 and the detected value is supplied to adder 13 with the opposite polarity. The adder 13 compares the trapezoid waveform signal from terminal $T_2$ with the current signal from resistor 4. The difference between these two signals is supplied to the base terminal of the transistor 3 by way of the amplifier 12 and controls the conductivity of the transistor 3. Therefore, the current in the exciting coil 1 becomes the trapezoid waveform shown as (d) of FIG. 2A.

When the frequency of the command pulses P, shown as (a) of FIG. 2B, becomes high and high speed revolution is commanded to the pulse motor, the outputs of the rectangular waveform, shown as (b) and (c) of FIG. 2B, appear at the terrminals of the waveform generator 9. Therefore, the output of the flip-flop circuit 10 is set and the output of the amplifier 11 turns on transistor 2. The transistor 3 is also turned on by the rectangular waveform output of amplifier 12. Thus, the current in the exciting coil 1 is supplied from high voltage terminal $V_H$ via transistor 2, the exciting coil 1, transistor 3 and resistor 4. The waveform of said current has very sharp rising portions as shown by (d) of FIG. 2B.

The current in the exciting coil 1 is detected by resistor 4, and the detected value is negatively fed back to the adder 13 and is also fed back to the reset terminal of the flip-flop circuit 10. When the current having very sharp rising portions, as a result of high voltage application, exceeds a predetermined value, the flip-flop circuit 10 is reset, its output becomes zero and transistor 2 is placed in an off condition. Therefore, the current in the exciting coil 1 flows via the exciting coil 1, diode 6, the high voltage terminal $V_H$, the low voltage terminal $V_L$, resistor 7 and diode 5 and said current is attenuated, after which the current in the exciting coil 1 is supplied from the low voltage terminal $V_L$ via resistor 7, diode 5, exciting coil 1, transistor 3 and resistor 4. The peak value of the exciting current is adjusted by changing the value of variable resistor 14 which is inserted in the reset terminal of the flip-flop circuit 10.

The above explanation is related to only one phase of the pulse motor and it is to be understood that the n phase pulse motor provides n exciting coils and the exciting current flowing through each coil has the phase difference of 1/n of one period. When operating at low speeds, the exciting currents of trapezoid waveform shown as (d) of FIG. 2A are supplied to exciting coils and the pulse motor rotates in the continuous and smooth motions. For example, in the two phase-three phase alternate excitation system, the coils are excited in the order of A phase, B phase; A phase, B phase, C phase; B phase, C phase; B phase, C phase, D phase;. In this case, the magnetic field of the phases which are newly excited or de-excited is gradually increased or decreased in accordance with the trapezoidal waveform, therefore, the revolution of the pulse motor can be effected smoothly.

During high speed operation, high voltage is supplied at the rising time of each current pulse and the currents, as shown by (d) of FIG. 2B, are supplied to the exciting coils. Therefore, the pulse motor can obtain sufficiently high starting torques and can suitably follow high speed command pulses.

FIG. 3 shows a block diagram of the waveform generator 9 shown in FIG. 1. Referring to FIG. 3, the five phase ring counter 8 is a circuit which controls exciting phases in accordance with the input command pulses P. That is, the five phase ring counter 8 generates rectangular pulses which select the phases to be excited. And connecting means A, B, C, D and E are provided for sending rectangular pulses ESa, ESb, ESd and ESe. As shown in (b) through (f) of FIG. 4A or 4B, these rectangular pulses ESa, ESb, ESc, ESd and ESe have phase differences corresponding to two periods of command pulses. FIGS. 4A and 4B are waveforms in parts of the driving circuit when low speed and high speed command pulses are respectively supplied to the pulse motor. As is clear from (a) through (f) of FIG. 4A and FIG. 4B, in the period $T_1$ or $t_1$, the exciting coils of phases A, D and E are selected, in the period $T_2$ or $t_2$, the exciting coils of phases A and E are selected, and in the period $T_3$ or $t_3$, the exciting coils of phases A, B and E are selected. After this, a similar two phase-three phase alternate excitation is repeated each time an input command pulse is received.

Reference number 21 indicates a three-two phase detecting circuit and generates rectangular wave TRD which has logic "1" in three phase excitation and logic "0" in two phase excitation, shown as (1) of FIGS. 4A and 4B. Reference number 22 indicates a triangular waveform generator, amplifying the rectangular waveform TRD of the three-two phase detecting circuit 21 to the amplitude proportional to the frequency of the command pulses, integrating the amplified waveform with a Millar integrator and generating a triangular waveform signal TRS, shown as (m) of FIGS. 4A and 4B. The rectangular wave signal TRD, triangular signal TRS and rectangular pulse signals ESa through ESe are precisely synchronized and the pulse widths of the rectangular pulse signals ESa through ESe are an integer times (in the present example, five times) the pulse width of the rectangular waveform signal TRD (the pulse width of the signal TRD is equal to the period of the command pulse). Reference number 23 indicates a timing circuit which receives one of the rectangular waveform pulses ESa through ESe (in the present example: ESa) and the rectangular waveform signal TRD of the three-two phase detecting circuit 21 and generates the output TMS, shown as (n) of FIGS. 4A and 4B. Said output TMS has logic 1 only in the periods $T_1$ and $T_6$ or $t_1$ and $t_6$ which correspond to one period of the command pulse at the rise or fall portion of the rectangular waveform pulse ESa and has logic 0 in other periods. This output signal is supplied to an inhibit input terminal of the inhibit gate 24 and one input terminal of the sampling gate 25 (see Millman and Taub: "Pulse, Digital and Switching Waveforms" pp. 627–667. published by McGrow-Hill Book Company). Another input terminal of the inhibit gate 24 receives the rectangular waveform pulse ESa, therefore, the leading portion of said pulse ESa is deleted over the period $T_1$ or $t_1$ and the rectangular waveform pulse GSa, shown as (g) of FIGS. 4A and 4B is obtained at the output terminal of the inhibit gate 24. The sampling gate 25 opens during the period $T_1$ or $t_1$ and $T_2$ or $t_2$, and sends out the rising portion which corresponds to the period $T_1$ of the triangular waveform pulse TRS and the falling portion which corresponds to the period $T_6$ of the triangular waveform pulse TRS. The analog adder 26 adds the outputs of the inhibit gate 24 and the sampling gate 25 and sends out the trapezoid waveform pulse TRPa, shown as (p) of FIG. 4A. The timing circuit 23, inhibit gate 24, sampling gate 25 and analog adder 26 are provided for other phases B, C, D and E, and the rectangular waveform pulses GSb through GSe, shown as (h) through (k) of FIG. 4A and the trapezoid waveform pulses TRPb through TRPe, shown as (q) through (t) of FIG. 4A are provided for other phases.

The speed detecting circuit 17 detects wheter the speed of the input command pulse is high or low, and generates logic 0 when the speed of input command pulse is high and logic 1 when said speed is low. These logic 0 and 1 correspond respectively to $V_s$, shown as (O) of FIGS. 4A and 4B. The output of the speed detecting circuit 17 is applied to the inhibit inputs of the inhibit gates 27 and 28 and the gate input of the sampling gate 29. Reference number 30 indicates an analog adder. As the rectangular waveform pulse is applied from connecting means A to another input terminal of the inhibit gate 27, the rectangular waveform pulse SOa, shown as (u) of FIG. 4B appears at the output of the inhibit gate 27 when the speed of the command pulses is high, and zero level, shown as (u) of FIG. 4A appears at the output of the inhibit gate 27 when the speed of the command pulses is low. The inhibit gate 28 generates logic 0 when the speed of the command pulses is low, and generates the pulse ESa when the speed of the command pulse is high. The sampling gate 29 generates a trapezoid pulse TRPa when the speed of the command pulses is low and logic 0 when the speed of the command pulses is high. Therefore, the analog adder 30 generates the rectangular waveform pulse ESa when the speed of the command pulses is high and the trapezoid waveform pulse TRPa when the speed of the command pulses is low. The same explanation is applicable with respect to other phases B through E. FIG. 4A shows waveforms appearing in each part of the diagram FIG. 3 when the speed of the command pulse is low and FIG. 4B shows waveforms appearing in each part of the diagram FIG. 3 when the speed of the command pulses is high.

Next, the three-two phase detecting circuit 21, the triangular waveform generator 22 and the timing circuit 23 will be explained.

Figures 5A, 5B:
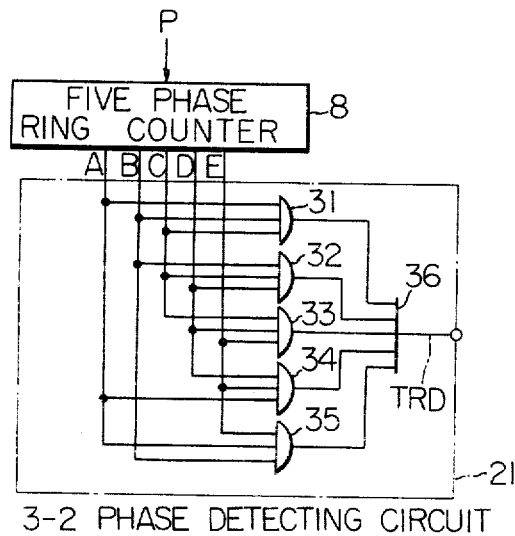
FIG. 5A is a block diagram of the three-two phase detecting circuit shown in FIG. 3.
FIG. 5B is a logic table of the three-two phase detecting circuit shown in FIG. 5A.

FIG. 5A is the logic circuit of the three-two phase detecting circuit 21 and FIG. 5B shows the logic table of circuit 21. Referring to FIG. 5B, the output logic signals of the five phase ring counter 8 are given as ESa through ESe. Each time the input pulse P is applied to the five phase ring counter 8, said counter 8 decides which two phase or three phase is to be excited and generates the logic signals which selects the phase to be excited in the order shown in FIG. 5B. The three-two phase detecting circuit shown in FIG. 5A is constituted to generate logic 1 during the three phase excitation and logic 0 during the two phase excitation. It is understood that the output of the three-two phase detecting circuit is TRD, shown as (1) of FIGS. 4A and 4B. Referring to FIG. 5Aa, reference numbers 31 through 35 are "AND" gates and 36 is an "OR" gate. The output of the OR gate 36 is given by the following logic equation:

ESa·ESb·ESc + ESb·ESc·ESd + ESc·ESd·ESe + ESd·ESe·ESa + ESe·ESa·ESb and the value of this logic equation becomes logic 1 only in the three phase excitation.

FIG. 6A shows the triangular waveform generator 22 and FIG. 6B shows the waveforms to explain the function of the circuit shown in FIG. 6A.

Referring to FIG. 6A, reference number 37 is a one shot multivibrator, 38 is an integrator which is composed of resistor R and capacitor C, 39 is an amplifier, 42 and 43 are sampling gates, 44 is an analog adder and 45 is a Millar integrator.

The output of the three-two phase detecting circuit 21, that is, the rectangular waveform signal TRD, as shown as (b) of FIB. 6B is applied to the one shot multivibrator 37 which converts said signal TRD into pulses MSP having predetermined amplitude (V) and pulse width (W), shown as (c) of FIG. 6B and said pulses MSP are applied to the integrator 38 which has a time constant RC, considerably larger than the pulse width of the pulses MSP. Therefore, the output of the integrator is a voltage (V. W. $f/2$), which is nearly proportional to the speed f of the input pulse P and is shown as (d) of FIG. 6B. The output of the integrator 38 is amplified by the amplifier 39 and the output ITI (shown as (e) of FIG. 6B) of the amplifier 38 is applied via the sampling gate 42 or the inverter 40 and the sampling gate 43, to the adder 44. Because the control input terminal of the sampling gate 42 is connected from the output terminal of the three-two phase detecting circuit 21, the sampling gate 42 is opened during three phase excitation. And, because the output terminal of the three-two phase detecting circuit 21 is connected via the inverter 41 to the control input terminal of the sampling gate 43, the sampling gate is opened during the two phase excitation. Therefore, the output AMS which oscillates with an amplitude $kV$, W. $f$ ($k$ is a gain of the amplifier 39), shown as (f) of FIG. 6B, is obtained at the output terminal of the adder 44. The output AMS of the adder 44 is applied to the Millar integrator 45, is integrated and converted to the triangular waveform voltage MIŌ, shown as (g) of FIG. 6B. A peak voltage value Emax of the triangular waveform voltage MIŌ is given to the following equation which is independent of the speed f of the input phase.

Emax = $k$. V. W/2 ($k$ = constant)

By changing the gain $k$ of the amplifier 39, the peak value Emax of the triangular waveform voltage MIŌ can be adjusted to the same value as the amplitude of the output of the timing circuit 23 shown in FIG. 3. Therefore, if the speed of the input command pulses P varies, the precise trapezoid waveform signal is obtained from the analog adder 26 shown in FIG. 3.

Figure 7A:
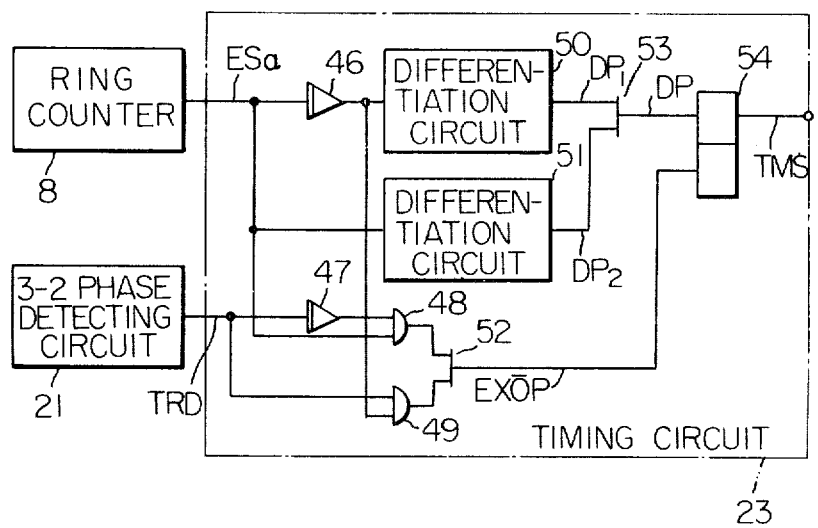
FIG. 7A is a block diagram of the timing circuit shown in FIG. 3.
Figure 7B:
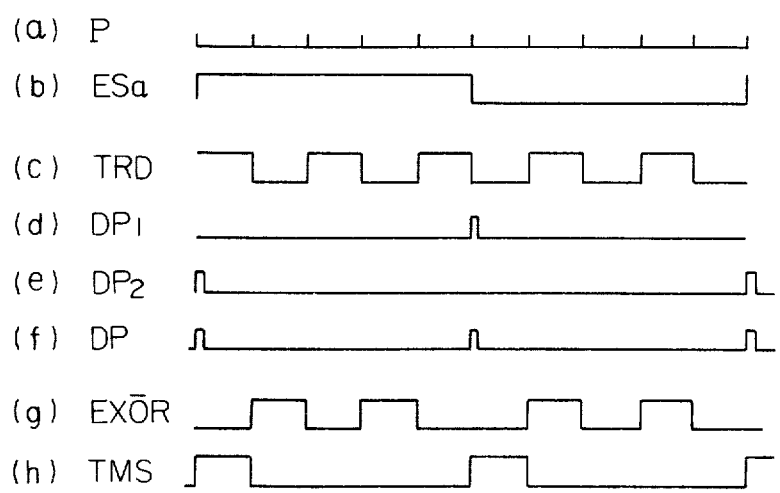
FIG. 7B is a series of signal waveforms at several points in the block circuit diagram shown in FIG. 7A.

FIG. 7A shows a detailed circuit diagram of the timing circuit 23 and FIG. 7B shows waveforms in each part of the circuit shown in FIG. 7A. The circuit in FIG. 7A shows only phase A of the pulse motor, however, it is understood that similar circuits are provided with respect to others phases. Referring to FIG. 7A, reference numbers 46 and 47 show inverters, reference numbers 48 and 49 are AND gates, 52 and 53 are OR gates, 50 and 51 are differentiation circuits and 54 is a RS type flip-flop circuit. The differentiation circuit 51 generates a pulse $DP_2$ shown as ($e$) of FIG. 7B at a rising time of the A phase exciting rectangular wave signal ES$a$, shown as ($b$) of FIG. 7B. The A phase exciting signal ES$a$ is also applied via the inverter 46 to the differentiation circuit 50 where said signal ES$a$ is defferentiated and generates a pulse $DP_1$ shown as ($d$) of FIG. 7B. The outputs $DP_1$ and $DP_2$ of the differentiation circuits 50 and 52 are supplied to the input terminals of the OR gates 53 which generate pulse DP, shown as ($f$) of FIG. 7B. At the same time, inverters 46 and 47, AND gates 48 and 49, and OR gate 52 constitute the circuit which obtains an exclusive OR between the A phase exciting rectangular wave pulse signal ES$a$ and the three phase exciting signal TRD, and the exclusive OR signal EX$\overline{OR}$, shown as ($g$) of FIG. 7B, is produced at the output of the OR gate 52. The output signal DP of the OR gate 53 is applied to a set input terminal of the flip-flop circuit 54 and the exclusive OR signal EX$\overline{OR}$ is applied to a reset input terminal of the flip-flop circuit 54; therefore, the output signal TMS having a pulse width equal to one period of the input pulses appears, every fifth period of the input pulses, at a set side output terminal of the flip-flop circuit 54.

Figure 8A:
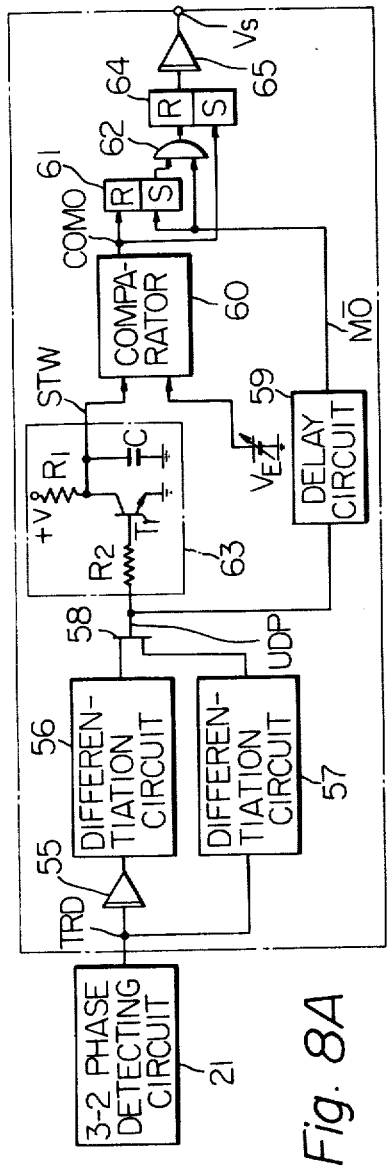
FIG. 8A is a block circuit diagram of the speed detecting circuit shown in FIG. 3.
Figure 8B:
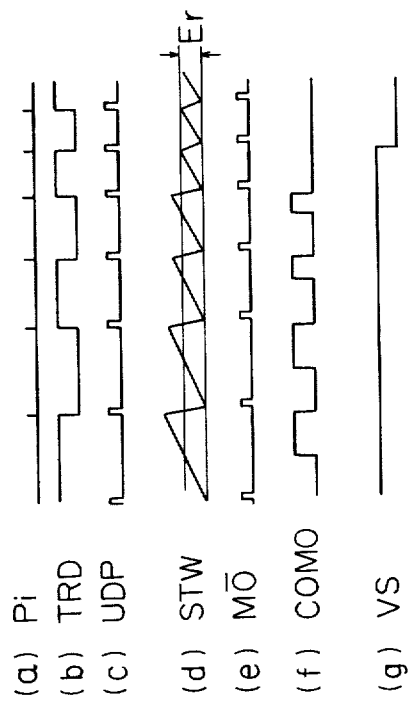
FIG. 8B is a series of signal waveforms at several points in the block circuit diagram shown in FIG. 8A FIGS. 9A and 9B are graphs depicting time-revolution angle characteristics of the pulse motor when the motor is driven, respectively, by poly-phase rectangular exciting signals and by poly-phase trapezoid exciting signals.

FIG. 8A shows a detailed circuit diagram of the speed detecting circuit 17 in FIG. 3 and FIG. 8B shows waveforms in each part of the circuit shown in FIG. 8A. Referring to FIG. 8A, reference numbers 55 and 65 indicate inverters, referece numbers 56 and 57 differentiation circuits, 58 an OR gate, 59 a delay circuit, 60 a comparator, 61 and 64 flip-flop circuits, 62 an AND gate, and 63 indicates an integrator. The integrator 63 generates a sawtooth wave STW, shown as ($d$) of FIG. 8B with a period which is determined by the input pulse Pi. That is, when the transistor Tr is in an off condition, capacitor C is charged by an electric source V via a resistor R with a time constant RC and when the transistor Tr is in an on condition, the stored charge in the capacitor C is discharged instantaneously via the transistor Tr, and the sawtooth wave signal STW appears at the input of the comparator 60. Voltage source $V_E$ is a variable voltage source, the value of which is established as a voltage Er corresponding to a speed to be changed. The comparator 60 compares the output voltage of the integrator 63 and the reference voltage Er and generates a signal logic 1 C$\overline{OMO}$, shown as ($f$) of FIG. 8B, when the output voltage of the integrator 63 is greater than the reference voltage Er.

The three phase signal TRD generated in the three-two phase detecting circuit is directly applied via the inverter 55 to the inputs of the differentiation xiexuira 56 and 57 and the outputs of the differention circuits 56 and 57 are supplied to the OR gate where an output pulse UDP, shown as ($c$) of FIG. 8B, is generated. This pulse UDP is applied to the delay circuit 59 and is converted to a pulse signal M$\overline{O}$ which has a predetermined time delay. The output of the delay circuit 59 is applied to a set input of the flip-flop circuit 61 and the gate 61. Further, the pulse UDP is supplied to the integrator 63 and activates the transistor Tr, generating the sawtooth output STW in the manner previously mentioned. The output C$\overline{OMO}$ of the comparator 60 is applied to a reset side input of the flip-flop circuit 61. When the speed of the command pulse P is slow, the output pulse M$\overline{O}$ of the delay circuit 59 and the output C$\overline{OMO}$ of the comparator 60 appear alternately, the flip-flop circuit 61 repeats alternately set condition and reset condition. Therefore, the AND gate does not pass the output pulse M$\overline{O}$ and the flip-flop circuit 64 is maintained in a set condition.

When the speed of the command pulses becomes high and the output STW of the integrator does not exceed the value of the reference voltage Er, the comparator 60 cannot reset the flip-flop circuit 61. Therefore, the output M$\overline{O}$ of the delay circuit 59 passes through the AND gate 62 and resets the flip-flop circuit 64. A reset side output signal of the flip-flop circuit 64 is inverted by the inverter 65 and the output signal VS, shown as ($g$) of FIG. 8B which can distinguish high and low speed of the command pulses is obtained at the output of the flip-flop circuits 64. When the speed of the command pulse P changes from the high speed region to the low speed region, the flip-flop circuit 64 is set by the output of the comparator 60.

Time-revolution angle characteristics of the pulse motor, when the current of each coil is controlled by the rectangular exciting signal are shown as ($a$) through ($e$) of FIG. 9A; and time-revolution angle characteristics of the pulse motor when the current of each coil is controlled by the poly-phase trapezoid exciting signal, are shown as ($a$) through ($e$) of FIGS. 9B.

Referring to FIGS. 9A and 9E, ($a$) of FIGS. 9A and 9B represents the time-revolution angle characteristics wherein the speed of the command pulses is 20 pulses/sec, ($b$) of FIGS. 9A and 9B represents cases wherein the speed of the command pulses is 40 pulses/sec, ($c$) of FIGS. 9A and 9B represents cases wherein the speed of the command pulses is 80 pulses/sec, ($d$) of FIGS. 9A and 9B represents cases wherein the speed of the command pulses is 160 pulses/sec and ($e$) of FIGS. 9A and 9B represents situations wherein the speed of the command pulses is 200 pulses/sec.

As is clear from FIGS. 9A and 9B when the exciting currents of the exciting coils are controlled by the poly-phase trapezoid waveform signals, shown as ($a$) through ($e$) of FIG. 9B, the pulse motor is more smoothly and continuously driven, by low speed command pulses, compared to the situation wherein the exciting currents are controlled by the rectangular waveform pulse signals, shown as ($a$) through ($e$) of FIG. 9A.

By driving the pulse motor assembly and continuously, a surface which is finished by a numerically controlled finishing machine using the pulse motor as a servomotor, can be considerably improved and noise generated due to resonance between driving frequencies of the pulse motor and the finishing machine can be decreased. Further, from FIGS. 9A and 9B, it is clear that a trapezoid waveform pulse signal is suitable for low speed driving of the pulse motor and a rectangular waveform pulse signal is suitable for high speed driving of the pulse motor because the rise time of the exciting current becomes rapid, by using a rectangular waveform pulse signal. Therefore, when the trapezoid waveform generator according to the presentn invention is used for driving the pulse motor, it is necessary to select the trapezoid waveform or the rectangular waveform in accordance with whether the command speed is high or low.

As detailed above, according to the present invention, the step action of the pulse motor at low speeds can be carried out continuouslsy and insufficient torque due to the inductance of the exciting coil at high speeds can be completely compensated, therefore, excellent driving characteristics of the pulse motor can be obtained in low speed conditions as well as in high speed conditions.

What is claimed is:

1. A system for driving a pulse motor in response to command pulses comprising:

exciting signal generating means for generating poly-phase rectangular exciting signals each of which has a predetermined phase difference depending on the speed of said command pulses and poly-phase trapezoid exciting signals each of which has a predetermined phase difference depending on the speed of said command pulses, controlling means for controlling exciting currents which are supplied to exciting coils of said pulse motor in response to both the poly-phase rectangular exciting signals and the poly-phase trapezoid exciting signals, speed detecting means for detecting whether said speed of said command pulses is lower or higher than a predetermined speed, and means for supplying said poly-phase trapezoid exciting signals to said controlling means when said speed of said command pulses is in a low range and for supplying said poly-phase rectangular exciting signals to said controlling means when said speed of said command pulses is in a high range.

2. A system for driving a pulse motor according to claim 1, wherein said exciting signal generating means comprises:

rectangular waveform signal generating means which generates rectangular exciting signals depending on the speed of the command pulses;

triangular waveform signal generating means which generates triangular waveform voltage signal repeating increases and decreases each time said command pulse is applied;

timing signal generating means which generates timing signals which are synchronized with said command pulses;

gate means which are controlled to open and close by said timing signals;

means for obtaining poly-phase trapezoid waveform signals by directing said rectangular waveform signals and said triangular waveform signals into said gate means.

3. A system for driving a pulse motor according to claim 2, wherein said timing signal is a logic 1 during the period of said command pulse corresponding to the rise and fall portions of said rectangular exciting signal.

4. A system for driving a pulse motor according to claim 3, wherein said gate means passes a portion of said rectangular waveform signal at the time said timing signal is a logic 0 and passes a portion of said triangular waveform signal at the time said timing signal is a logic 1.

* * * * *